United States Patent
Harrison

(10) Patent No.: US 11,688,298 B1
(45) Date of Patent: Jun. 27, 2023

(54) METHOD FOR LEARNING MUSIC SCALE THEORY

(71) Applicant: Jeremy Dean Harrison, Stevenson Ranch, CA (US)

(72) Inventor: Jeremy Dean Harrison, Stevenson Ranch, CA (US)

(*) Notice: Subject to any disclaimer, the term of this patent is extended or adjusted under 35 U.S.C. 154(b) by 1 day.

(21) Appl. No.: 17/673,077

(22) Filed: Feb. 16, 2022

(51) Int. Cl.
*G09B 15/02* (2006.01)
*G10G 1/00* (2006.01)

(52) U.S. Cl.
CPC .............. *G09B 15/026* (2013.01); *G10G 1/00* (2013.01)

(58) Field of Classification Search
CPC ................................. G09B 15/026; G10G 1/00
See application file for complete search history.

(56) References Cited

U.S. PATENT DOCUMENTS

| | | | | |
|---|---|---|---|---|
| 702,298 A * | 6/1902 | Frederickson | ......... | G09B 15/02 283/44 |
| 1,139,098 A * | 5/1915 | Bostwick | ............... | G09B 15/02 D19/64 |
| 1,392,977 A * | 10/1921 | Swan | ........................ | A63F 1/02 273/303 |
| 2,231,020 A * | 2/1941 | McCaulley | .......... | G09B 15/004 273/301 |
| 2,582,544 A * | 1/1952 | Johnson | .................... | A63F 1/02 84/481 |
| D377,374 S * | 1/1997 | Weston | ........................ | D21/376 |
| 6,111,180 A * | 8/2000 | DiGiulio | ............. | G09B 15/026 84/471 R |
| 6,588,756 B1 * | 7/2003 | Hughes | ..................... | A63F 1/04 273/299 |
| 7,325,805 B2 * | 2/2008 | Ritchie | .............. | A63F 3/00119 273/277 |
| 7,732,695 B1 * | 6/2010 | Sanderson | ............. | G09B 15/00 84/481 |

FOREIGN PATENT DOCUMENTS

CA 2868783 A1 * 4/2016 ............. G09B 15/00

* cited by examiner

*Primary Examiner* — Robert W Horn
(74) *Attorney, Agent, or Firm* — Kelly & Kelley, LLP

(57) ABSTRACT

A method for learning music scale theory includes utilizing a music theory-based card game. A plurality of cards forms a deck, each card representing a predetermined music note according to a 7-note system. One or more players are dealt cards to make a hand. Players draw cards from a draw deck or a discard pile, and discard cards to the discard pile, until a player creates a sequence of cards in the player's hand that corresponds to a complete musical scale or mode.

17 Claims, 4 Drawing Sheets

METHOD FOR LEARNING MUSIC SCALE THEORY

DESCRIPTION

FIELD OF THE INVENTION

The invention relates to card games, and in particular, games that are fun but also educational and help the players perfect their music theory skills, particularly the music theory concept of scales.

BACKGROUND OF THE INVENTION

Card games provide a source of entertainment for many. Competitive play is one of mankind's favorite endeavors. A deck of playing cards is almost certainly the most popular gaming tool of all time.

Playing cards are unique in the subclass of card or game tiles. Unlike specific game pieces, the appeal of playing cards is the wide variety of games that can be played simply by redefining the rules (playing a different game). A multi-dimensional system of relations between cards, and various subsets of cards, is essential to the versatility of a successful deck of playing cards.

The success of a deck of playing cards, as a gaming tool, is also due in no small way to its ergonomic physical attributes. Cards are portable and inexpensive. Opaque construction provides the security needed for competitive game play. The conventional rectangular shape facilitates shuffling the deck, a function that is essential in playing card games.

Traditionally, music theory is taught in a dry manner, in a linear format, utilizing standardized books and flash cards to accumulate and drill data, where drill means to repeat in order to reinforce memorization. Typically, music theory has been taught through the use of flash cards. Flash cards provide an educational resource for many, especially in music education. Proficiency in music theory requires repetition and reinforcement. While the use of flash cards has created some successes, some people simply do not learn well from flash cards because flash cards rely on memorization rather than an understanding of underlying concepts.

Therefore, it is desirable to have a fun and entertaining game, which is enjoyable for the players, but also helps students learn and visualize the music concepts so important for success as a musician. The inherent competitive nature of game playing naturally challenges players to engage their minds more actively and creatively than when consuming data from a book or flash cards. The present invention fulfills these needs and provides other related advantages.

SUMMARY OF THE INVENTION

The invention provides a music-based card game by combining music theory and interactive game play. In one aspect, the invention provides a method for placing music notes and intervals in a sequence, according to music scale theory, comprising: determining the correct location in the sequence to place the note and interval cards.

The invention provides a method for playing a game, involving the steps of determining a sequence; dealing to at least one player at least seven cards from a deck to make a hand, the deck having cards representing music notes and intervals. A typical combination sequence involves all seven cards in at least one player's hand.

The game of the present invention can be played for fun and entertainment, but will also help players learn and apply fundamental music concepts. The player will learn note concepts, and note value instant recognition. They will also learn interval values and recognition of the location of each interval in a music scale, for example, major 3rd, minor 3rd, perfect 5th. The player will also learn combinations of notes and intervals in order to make a scale using a combination of both notes and intervals. Therefore, the player will have fun and learn important music concepts at the same time.

In another aspect, the invention provides a method for reinforcement of music theory through playing against other players and/or students in a fun, interactive environment.

In another aspect, the invention provides a visual representation of music scales, one card at a time, where the cards can be moved around in different sequences to create different musical scales. The limited number of cards in the deck will cause the player to create a unique sequence based on the cards available to them during each round of game play. This challenges the player to rearrange and reorder their cards, further deepening the player's knowledge of music scale concepts.

It is an object of the invention to provide for a fun and educational card game.

It is further an object of the invention to teach a player fundamental music theory skills.

It is an object of the invention to teach music concepts by developing visualization techniques.

It is an object of the invention to teach the processes of notes and intervals and their relationship to each other.

It is an object of the invention to illustrate the system of music scales.

It is yet another object of the invention to provide a card game that can be played by players of all ages.

It is another object of the invention to teach a card game that can be played differently based on the age and skill development of the players.

It is also an object of the invention to teach a card game that can be played with an instructor.

In accordance with the present invention, a method for learning music scale theory comprises the steps of providing a plurality of cards forming a deck, each card representing a predetermined music note according to a seven-note system. The deck of cards comprises at least one set of cards required to reach a unique scale sequence that completes a theoretically correct music scale or mode. Typically, the deck of cards includes a card for each sharp and flat of the seven notes, or interval, based on all possible scale degrees.

A plurality of cards from the deck are dealt to at least one player to make a hand. Preferably, the player is dealt seven cards, such that the player's hand is seven cards. Undealt cards from the deck are used to create a draw deck. A discard pile of at least one card is created.

The at least one player draws a card from either the draw deck or the discard pile. A card from the hand is then discarded to the discard pile. The drawing and discarding steps are repeated until a player creates a sequence of cards in the player's hand of cards that corresponds to a complete musical scale or mode.

When the at least one player comprises multiple players, they play in rotating sequence. During each player's turn, the player can either take a card from the top of the draw deck or the discard pile. The game ends, and a player wins, when that player creates a sequence of cards in the player's hand that corresponds to a complete musical scale or mode.

The deck of cards may be shuffled before the dealing step. Alternatively, or additionally, the discard pile may be shuffled when the draw decks is depleted to create a new draw deck.

A player is limited to using each card in the hand only once to reach the scale or mode sequence.

The invention may include the step of removing interval cards from the deck.

An instructor may be provided to assist the at least one player in determining a completed scale or mode sequence of cards.

The scale sequence may be a major or minor scale, according to the circle of 5ths. The scale sequence may be a mode of a diatonic scale.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
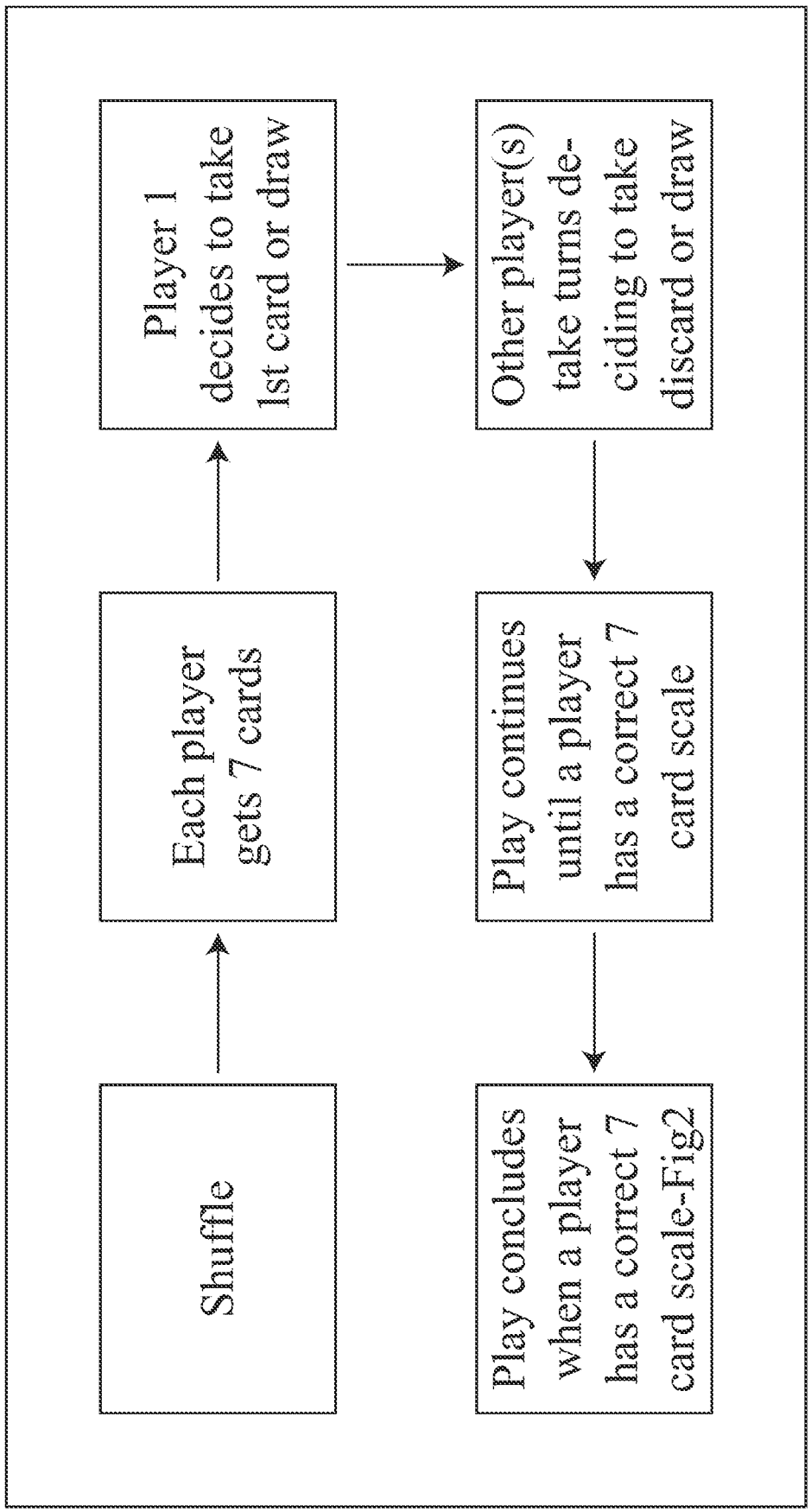
FIG. 1 shows a flow chart of the game and method of the present invention.
Figure 2:
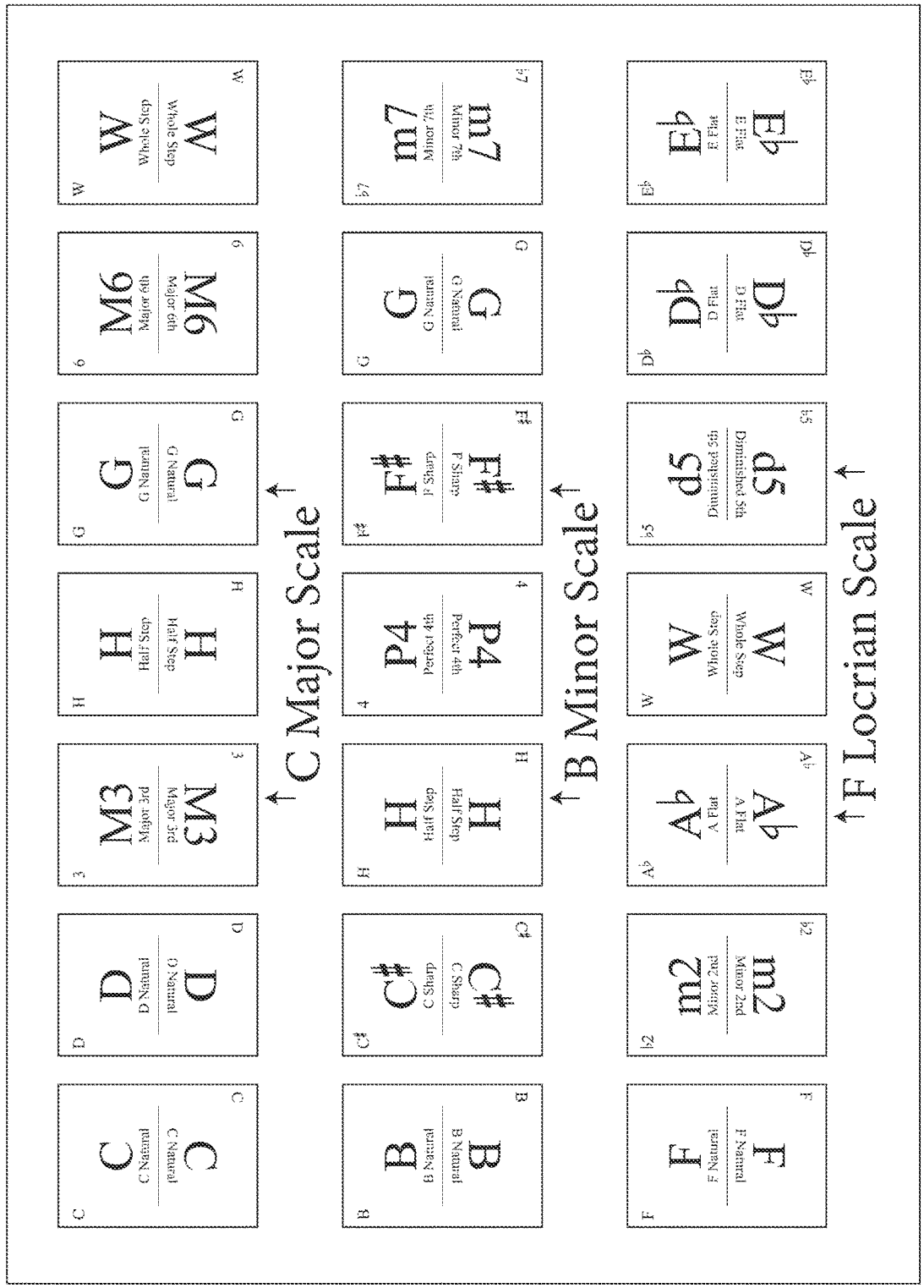
FIG. 2 shows an exemplary card deck of the invention.

While the invention is susceptible to various modifications and alternate forms, a specific embodiment thereof has been shown by way of example and the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the appended claims.

The game of the present invention can be played one of several different ways depending on the ages and the skills of the players. Any of the levels, however, can be played with any number of players. If more players are added, then it would be appropriate to increase the size of the deck as described below.

At all levels of the game, the object of the game is to combine cards from the deck to achieve a sequence which comprises and completes a valid music scale. In a preferred embodiment, the object is to use the face values of the cards dealt to make a major or minor music scale according to the theoretical music concept known as the "Circle of 5ths". Another embodiment would be to create a sequence known in music theory as a "mode" of a diatonic scale. Any sequence of cards equaling one of these values (a valid major or minor scale, or mode of a diatonic scale) would be appropriate and would determine the player the winner of the game.

At the beginning of the game, each player is dealt a plurality of cards, typically seven, which constitute his or her hand. The rest of the deck comprises a draw deck and is placed in front of one or more players with one card turned face up to form a discard pile. During the player's turn, he or she may choose to take the face up card, or draw a card from the top of the deck. After the player has decided whether to keep the newly drawn card, he or she will discard one card to keep their hand at seven cards.

In all embodiments of the game, the note cards will reflect their exact value (i.e. a C Sharp is a C sharp). In the preferred embodiment of the game, the interval cards will be in relation to the first card of the scale, known as the Root note, or Tonic. For example, the Perfect 5th interval card would represent the scale note that is the 5th note in sequence in the scale the player is attempting to complete. For example, the Perfect 5th above C Sharp is G Sharp, so if a player were trying to complete a C Sharp scale, the Perfect 5th card would be played as a substitute for G Sharp. There are two interval cards (Whole Notes and Half Notes), which can be played to represent any position in the music scale, according to their theoretically correct scale formula.

In the Major and Minor embodiment of the game, several cards in the game become unusable to game play, as they represent intervals that are not present in either Major or Minor scales.

In a more advanced embodiment of the game, players will form scale sequences, known in music theory as "modes," which are scales based on ascending degrees of the diatonic scale. In this embodiment, the remainder of the interval cards will be added to the deck in order to make forming those scale sequences possible. In the preferred embodiment of this level of game play, the interval cards would still be in relation to the Root note, or Tonic, as described previously.

In the most advanced embodiment of the game, the interval cards may be played in relation to any of the cards the player holds in their hand. For example, if a player held a Perfect 5th card, it could represent a Perfect 5th above or below any of the other cards in the music scale sequence. For example, a Perfect 5th above D Sharp is A Sharp, so if a player were trying to complete a C Sharp scale, they may play the Perfect 5th card as a substitution for A Sharp, claiming it represents a Perfect 5th above the 2 nd scale degree, which is D Sharp.

In any embodiment of the game, a person may serve as an instructor, in order to help the players place the card in the correct sequence in order to form an appropriate music scale.

Figure 3A:
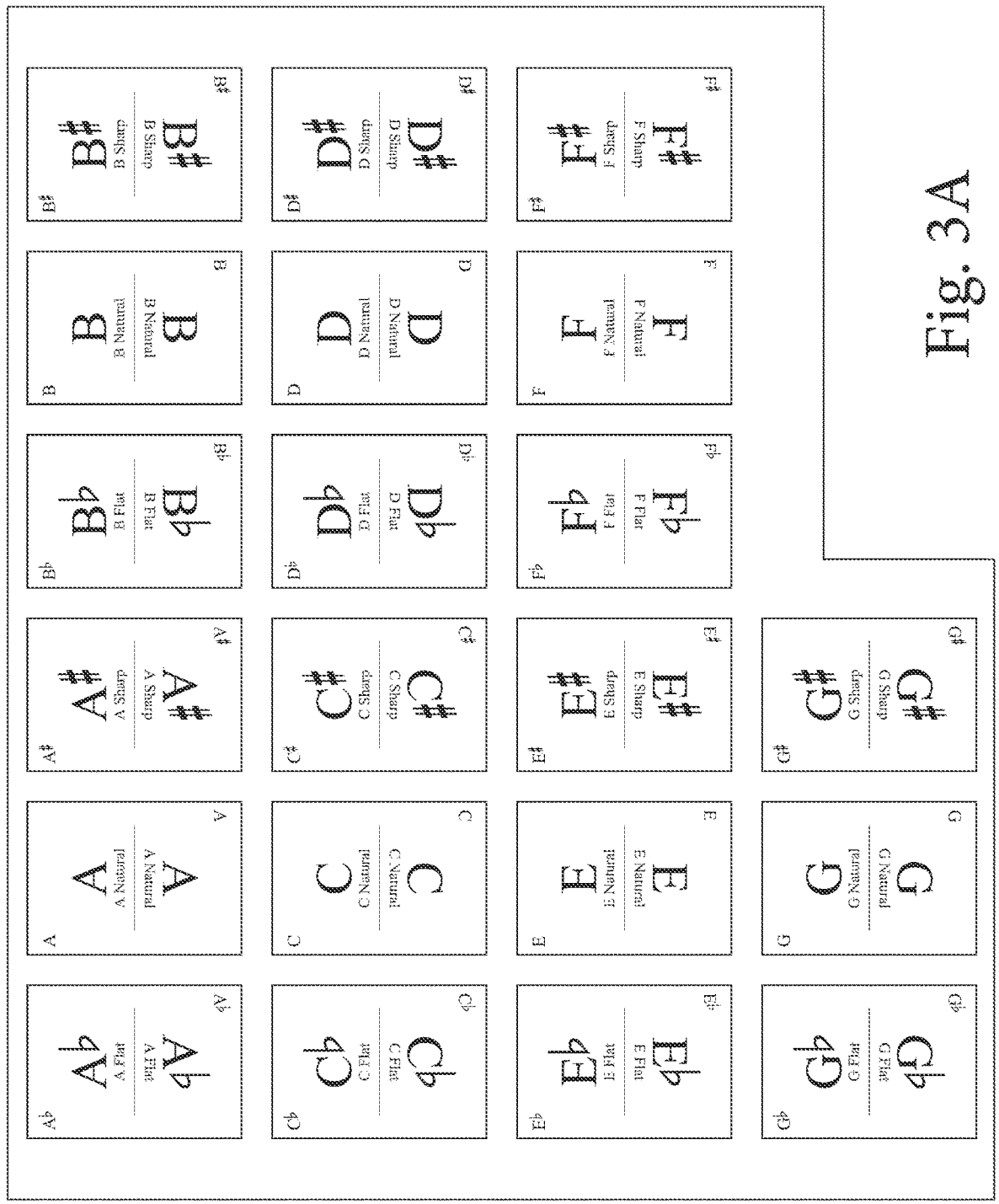
FIG. 3A and FIG. 3B shows an exemplary deck of cards embodying the invention, illustrating cards A flat through G Sharp, and all the intervals involved in making the music scales.
Figure 3B:
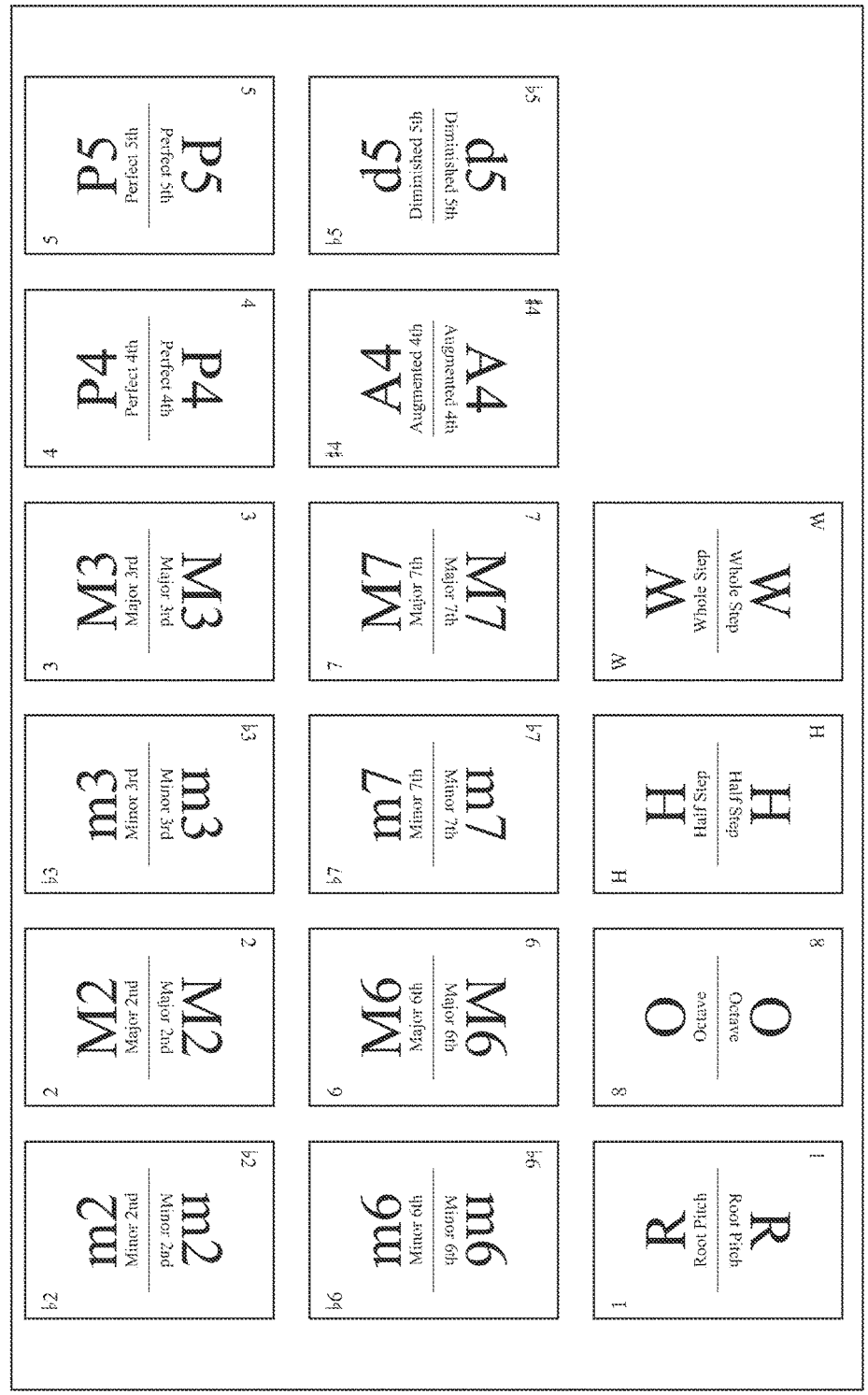

Cards used to play the game are illustrated in FIG. 3. A typical "group" of cards is a sequential deck, with all the notes of the 7-note music scale system, including naturals, sharps and flats of the -note system, and intervals. However, in different embodiments of the invention, decks with more or less cards could also be used. Other cards may be removed or added from each group of the deck in other embodiments.

Cards should be shuffled face down at the beginning of play and should be dealt from the top of this active draw pile. As cards are used, discarded cards are placed face up in a discard pile. When the active draw card pile gets low, the discard pile is turned over, shuffled, and put back into play.

The game can be ended when the first player completes the sequence of a theoretically correct major scale, minor scale, or mode.

The invention therefore provides for a user directed note and interval sequencing experience in a card game, with provided instruction on possible scale combinations.

Although several embodiments have been described in detail for purposes of illustration, various modifications may be made without departing from the scope and spirit of the invention. Accordingly, the invention is not to be limited, except as by the appended claims.

What is claimed is:

1. A method for learning music scale theory, comprising the steps of:
    providing a plurality of cards forming a deck, each card representing a predetermined music note according a 7-note system, wherein the deck of cards comprises at least one set of cards required to reach a unique scale sequence that completes a theoretically correct music scale or mode;
    dealing to at least one player a plurality of cards from the deck to make a hand;
    using undealt cards from the deck to create a draw deck;
    creating a discard pile of at least one card;
    drawing a card from either the draw deck or the discard pile;
    discarding a card from the hand to the discard pile; and
    repeating the drawing and discarding steps until a player creates a sequence of cards in the player's hand of cards that corresponds to a complete musical scale or mode.

2. The method of claim 1, wherein the deck of cards includes a card for each sharp and flat of the seven notes, or interval, based on all possible scale degrees.

3. The method of claim 1, wherein the player is limited to using each card in the hand only once to reach the scale or mode sequence.

4. The method of claim 1, including the step of removing interval cards from the deck.

5. The method of claim 1, including the step of providing an instructor to assist the player in determining a completed scale or mode sequence of cards.

6. The method of claim 1, wherein the scale sequence is a major or minor scale, according to the Circle of 5ths.

7. The method of claim 1, wherein the scale sequence is a mode of the diatonic scale.

8. The method of claim 1, wherein the player's hand is seven cards.

9. The method of claim 1, including the step of shuffling the deck of cards before the dealing step or shuffling the discard pile when the draw deck is depleted to create a new draw deck.

10. The method of claim 1, wherein the at least one player comprises multiple players who play in rotating sequence, and during each player's turn the player can either take a card from the top of the draw deck or the discard pile.

11. A method for learning music scale theory, comprising the steps of:
    providing a plurality of cards forming a deck, each card representing a predetermined music note according a 7-note system, wherein the deck of cards comprises a card for each sharp and flat of the seven notes, or interval, based on all possible scale degrees required to reach a unique scale sequence that completes a theoretically correct music scale or mode;
    dealing to each of a plurality of players seven cards from the deck to make a hand;
    using undealt cards from the deck to create a draw deck;
    creating a discard pile of at least one card;
    each player, in sequence, either drawing a card from the draw deck or the discard pile and discarding a card from the player's hand to the discard pile until a player creates a sequence of seven cards in the player's hand that corresponds to a complete musical scale or mode.

12. The method of claim 11, wherein the player is limited to using each card in the hand only once to reach the scale or mode sequence.

13. The method of claim 11, including the step of removing interval cards from the deck.

14. The method of claim 11, including the step of providing an instructor to assist the player in determining a completed scale or mode sequence of cards.

15. The method of claim 11, wherein the scale sequence is a major or minor scale, according to the Circle of 5ths.

16. The method of claim 11, wherein the scale sequence is a mode of the diatonic scale.

17. The method of claim 11, including the step of shuffling the deck of cards before the dealing step or shuffling the discard pile when the draw deck is depleted to create a new draw deck.

* * * * *